United States Patent
Lam (10) Patent No.: US 9,420,019 B2
(45) Date of Patent: Aug. 16, 2016

(54) METHOD AND SYSTEM FOR SECURING CONTENT COMMUNICATION IN CHUNKS FROM A CONTENT DELIVERY NETWORK TO A USER RECEIVING DEVICE

(71) Applicant: The DIRECTV Group, Inc., El Segundo, CA (US)

(72) Inventor: Thai Lam, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 466 days.

(21) Appl. No.: 13/751,807

(22) Filed: Jan. 28, 2013

(65) Prior Publication Data

US 2014/0215018 A1 Jul. 31, 2014

(51) Int. Cl.
*G06F 15/16* (2006.01)
*H04L 29/06* (2006.01)
*H04N 21/845* (2011.01)
*H04N 21/258* (2011.01)

(52) U.S. Cl.
CPC .......... *H04L 65/4069* (2013.01); *H04L 63/108* (2013.01); *H04L 65/4084* (2013.01); *H04L 65/602* (2013.01); *H04N 21/25816* (2013.01); *H04N 21/25875* (2013.01); *H04N 21/845* (2013.01)

(58) Field of Classification Search
CPC . H04L 29/06; H04L 65/4069; H04L 65/4084; H04L 63/108; H04N 21/845
USPC .................................................. 709/219, 217
See application file for complete search history.

(56) References Cited

U.S. PATENT DOCUMENTS

| | | | |
|---|---|---|---|
| 2004/0162787 A1 | 8/2004 | Madison et al. | |
| 2010/0058405 A1* | 3/2010 | Ramakrishnan et al. | 725/97 |
| 2011/0173345 A1* | 7/2011 | Knox et al. | 709/246 |
| 2012/0047542 A1 | 2/2012 | Lewis et al. | |

(Continued)

OTHER PUBLICATIONS

Van Brandenburg, R.; Van Deventer, O.; Le Faucheur, F.; Leung, K.; Cisco Systems; "Models for Adaptive-Streaming-Aware CDN Interconnection"; draft-brandenburg-cdni-has-04.txt; Internet Engineering Task Force, IETF; standardworkingdraft; Internet Society (ISOC), 4, Rue Des Falaises CH-1205, Switzerland; Jan. 10, 2013; pp. 1-44; XP015089416; [retrieved on Jan. 10, 2013]; abstract; sections 1, 2, 3.5.

(Continued)

*Primary Examiner* — Benjamin M Thieu
(74) *Attorney, Agent, or Firm* — Harness, Dickey & Pierce, P.L.C.

(57) ABSTRACT

A user receiving device and method includes a content delivery network manager interaction module communicating a request for a content delivery network address for a content to a content delivery network manager and receiving the content delivery network address for a content delivery network and a content delivery network token from the content delivery network manager. The user receiving device also includes a manifest interaction module communicating a manifest request to the content delivery network address of the content delivery network and receiving a manifest from the content delivery network comprising a plurality of chunk addresses. The user receiving device also includes a content delivery network interaction module generating requests for chunks of the content from the content delivery network using the content delivery network token and a respective chunk address and receiving the chunks from the content delivery network.

37 Claims, 7 Drawing Sheets

(56) References Cited

U.S. PATENT DOCUMENTS

| | | | |
|---|---|---|---|
| 2012/0066386 A1 | 3/2012 | McGowan et al. | |
| 2012/0259946 A1* | 10/2012 | Stockhammer et al. | 709/217 |
| 2013/0080267 A1* | 3/2013 | McGowan | 705/14.73 |
| 2013/0086279 A1* | 4/2013 | Archer et al. | 709/233 |
| 2013/0198328 A1* | 8/2013 | Green et al. | 709/217 |
| 2013/0308699 A1* | 11/2013 | Musser et al. | 375/240.03 |
| 2014/0019632 A1* | 1/2014 | Fall | 709/231 |
| 2014/0115724 A1* | 4/2014 | van Brandenburg et al. | 726/30 |
| 2014/0207964 A1* | 7/2014 | Philpott et al. | 709/231 |

OTHER PUBLICATIONS

Sniffen, Brian; "Practically Engageable Adversaries for Streaming Media": Internet citation; Jan. 1, 2009; pp. 1-9; XP002696092; Retrieved from the Internet: URL:http://diedem.wiki.evenmere.org/users/bts/publications/sniffen-fast2009-web.pdf [retrieved on Apr. 23, 2013]; abstract; figure 3; sections 1, 2, 4.

International Search Report and Written Opinion dated May 13, 2014 in International Application No. PCT/US2014/012112 filed Jan. 17, 2014 by Thai Lam.

* cited by examiner

METHOD AND SYSTEM FOR SECURING CONTENT COMMUNICATION IN CHUNKS FROM A CONTENT DELIVERY NETWORK TO A USER RECEIVING DEVICE

TECHNICAL FIELD

The present disclosure relates generally communicating between a service provider and a user device, and, more specifically, to managing the communication of content in chunks between a content delivery network and a user receiving device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast from the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

A content delivery network is typically used to deliver content to the client device through a terrestrial network. The content delivery network may be controlled by a separate entity compared to the provider of the broadcast services. Typically, a publisher actively transfers data to the content delivery network as the content becomes available. This is known as data push or data pre-cache.

On-demand content is one example of content that may be provided by the content delivery network. Oftentimes, the content to be provided is a relatively large data file. For example, a movie is oftentimes one and a half to two hour in length. The data size of such file is large. In a typical content delivery method, the entire content is communicated as one file. This limits the client device front viewing the content until the entire file is created.

To allow a client device to begin playback of the content sooner, the content may be broken up into chunks smaller than the entire content. After one or more chunks are received, playback may begin. One problem with providing content in chunks is that a significant amount of processing overhead and delay may prevent smooth video rendering. That is, each content chunk acts as a separate file and therefore the security is changed for each content chunk. Separate tokens are typically required as well as management of the tokens in each chunk. This can cause a delay in providing the chunks to the client.

Providing protection for content from unauthorized use is also important. Oftentimes a service provider is obligated to the rights holders to protect the content during streaming. One type of threat that unauthorized users may obtain is access to a content universal resource locator. This is known as link sharing. Another way in which unauthorized users obtain access to content is called deep linking. In deep linking, a player is decompiled and a hidden URL is extracted and posted in a hacker's website. Other ways that theft may occur is that while content is being delivered the stream may be duplicated or redirected. Also, content may be stolen directly from a browser, player cache or storage medium.

SUMMARY

The present disclosure provides a method and system for efficiently providing chunks of content to a client application so that playback may begin quickly and securely.

In one aspect of the disclosure, a method includes communicating a manifest request to a content delivery network address of a content delivery network from a user receiving device, receiving a content delivery network token, receiving a manifest from the content delivery network comprising a plurality of chunk addresses, generating requests for chunks of the content from the content delivery network using the content delivery network token and a respective chunk address of the plurality of chunk addresses for each of the requests, and receiving the chunks at the user receiving device from the content delivery network in response to generating requests.

In another aspect of the disclosure, a method includes a communicating a request for a content delivery network address for a content from a client application of a user receiving device to a content delivery network manager, receiving the content delivery network address for a content delivery network and a content delivery network token at the client application from the content delivery network manager, communicating a manifest request to tire content delivery network address of the content delivery network, receiving a manifest from the content delivery network comprising a plurality of chunk addresses, generating requests for chunks of the content from the content delivery network using the content delivery network token and a respective chunk address and receiving the chunks at the user receiving device from the content delivery network.

In a further aspect of the disclosure, a user receiving device and method that interacts with a content delivery manager and a content delivery network includes a content delivery network manager interaction module communicating a request for a content delivery network address for a content to the content delivery network manager and receiving the content delivery network address for the content delivery network and a content delivery network token from the content delivery network manager. The user receiving device also includes a manifest interaction, module communicating a manifest request to the content delivery network address of the content delivery network and receiving a manifest from the content delivery network comprising a plurality of chunk addresses. The user receiving device also includes a content delivery network interaction module generating requests for chunks of the content from the content delivery network using the content delivery network token and a respective chunk address and receiving the chunks from the content delivery network.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identity similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM ROM phase-change memory or other discrete memory components.

Each general purpose computing device may be implemented in analog circuitry, digital, circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as wed as the actual content in a data stream or signal. The content or service provider may include a general purpose computing device, communication components, network interlaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems. Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Figure 1:
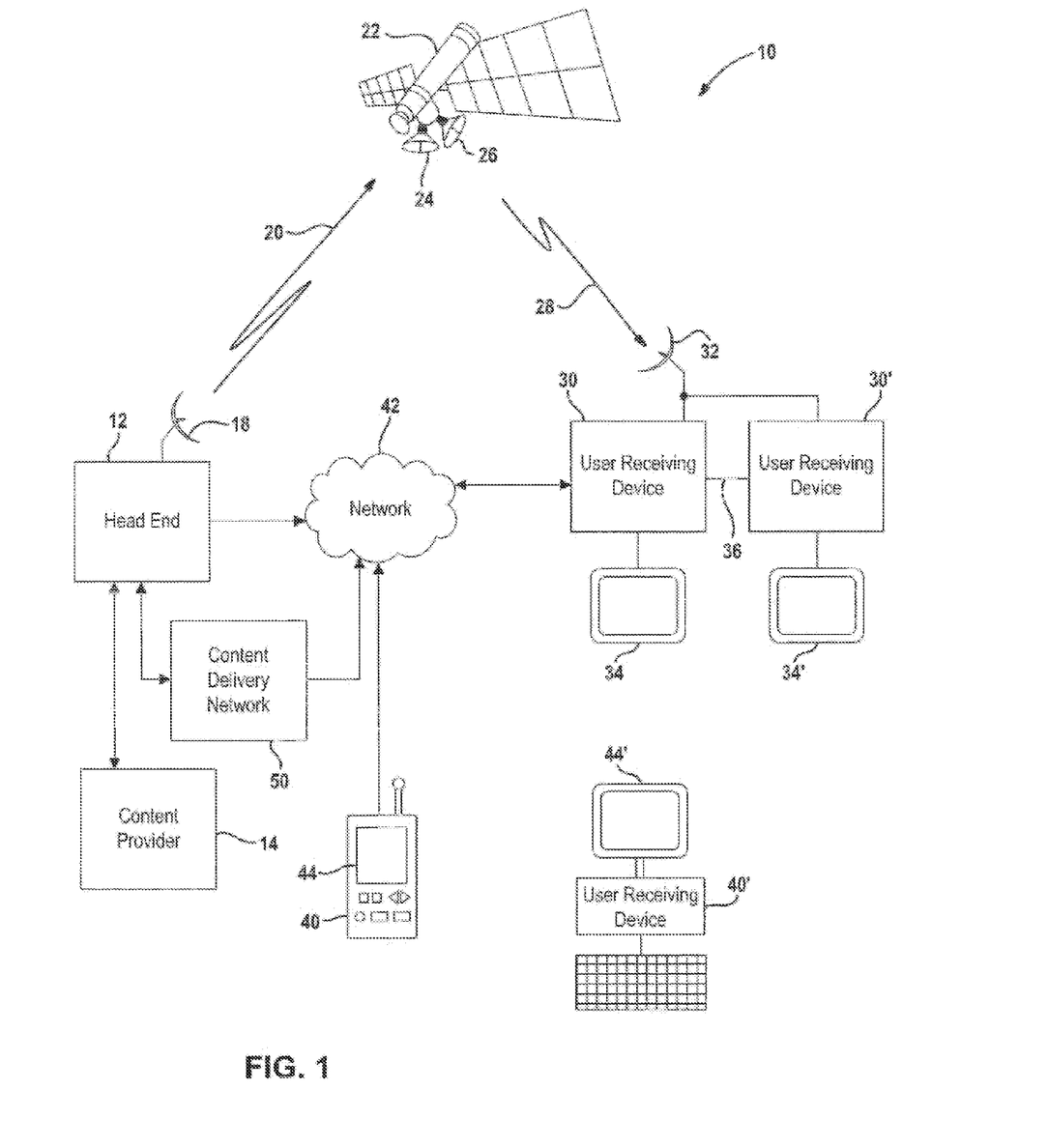
FIG. 1 is a block diagrammatic view of the communication system according to the present disclosure.

Referring now to FIG. 1, a communication system 10 is illustrated. The communication system 10 includes a head end 12 that is used as a content processing system and a transmission source. The head end 12 may also be used for distributing content and providing biding data. The details of the head end 12 will be further described below in FIG. 2.

A plurality of content providers 14, only one of which is illustrated, may provide content and data related to the content such as metadata to the head end 12. The metadata may include actors, a description, categories, ratings, broadcast time, channel identities, actors, directors and other data. The head end 12 receives various types of content and data from the content provider and communicates the content to various user devices associated with the system.

The head end 12 may communicate content to users in various manners including a satellite system and through terrestrial networks. Carrying through with the satellite example, the head end 12 includes an antenna 18 for communicating process content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

Two different types of user devices are illustrated. In this example, a first user device 30 includes a receiving antenna 32. The user device 30 has a display 34 associated therewith. The user device 30 may be referred to as a fixed user device because the user device is intended to be used from a fixed position on the surface of the earth. The user device 30 may be referred as a set top box. The user device 30 may include circuitry to tune, decode and store content therein. Details of the user device 30 are former described below.

The user device 30 may be in communication with a second user device 30' through a network 36 such as a local area network. The second user device 30' in user 30' and may be delivered to another in a multi-room viewing function.

Another type of user device includes a network user receiving device 40. The network user device 40 may not be capable of receiving signals from the satellite 22. Rather, the network user receiving device 40 may receive content through a network 42. The network user receiving device 40 may include a display 44 for displaying content thereon. The network user receiving device 40 may include various circuitry including a browser or other processing circuitry for receiving, decoding and processing the content so it may be displayed on the display 44. The network user receiving device 40 may be a mobile phone, personal digital assistant, or the like. The network user receiving device may be referred to as a mobile user device. Details of the network user receiving device will be further described below.

Another example of a network user receiving device is a computer 40'. The computer may also include a display 44' for displaying content thereon. The computer 40' may be a fixed (desktop) computer or a mobile (laptop) computer. Several user network device devices and user devices may be associated with a single account.

The network 42 may be a single network or a combination of different networks or different types of networks. For example, the network 42 may be a broadband wired network or wireless network. The network 42 may be a one-way network so that data may be communicated from the user device 30 to the head end 12. The network 42 may also be used in a two-way capacity for delivering content and data from the head end 12 in response to selection signals communicated from the user device 30, 30', 40 or 40'. The network 42 may be in communication with the local are network 36.

The headend 12 may also be in communication with a content delivery network 50. Although only one content delivery network 50 is illustrated, multiple content delivery networks may be associated with a communication system 10. The content delivery network 50 may receive content from the headend 12 for distribution to through the network 42 to the various user receiving devices.

Figure 2:
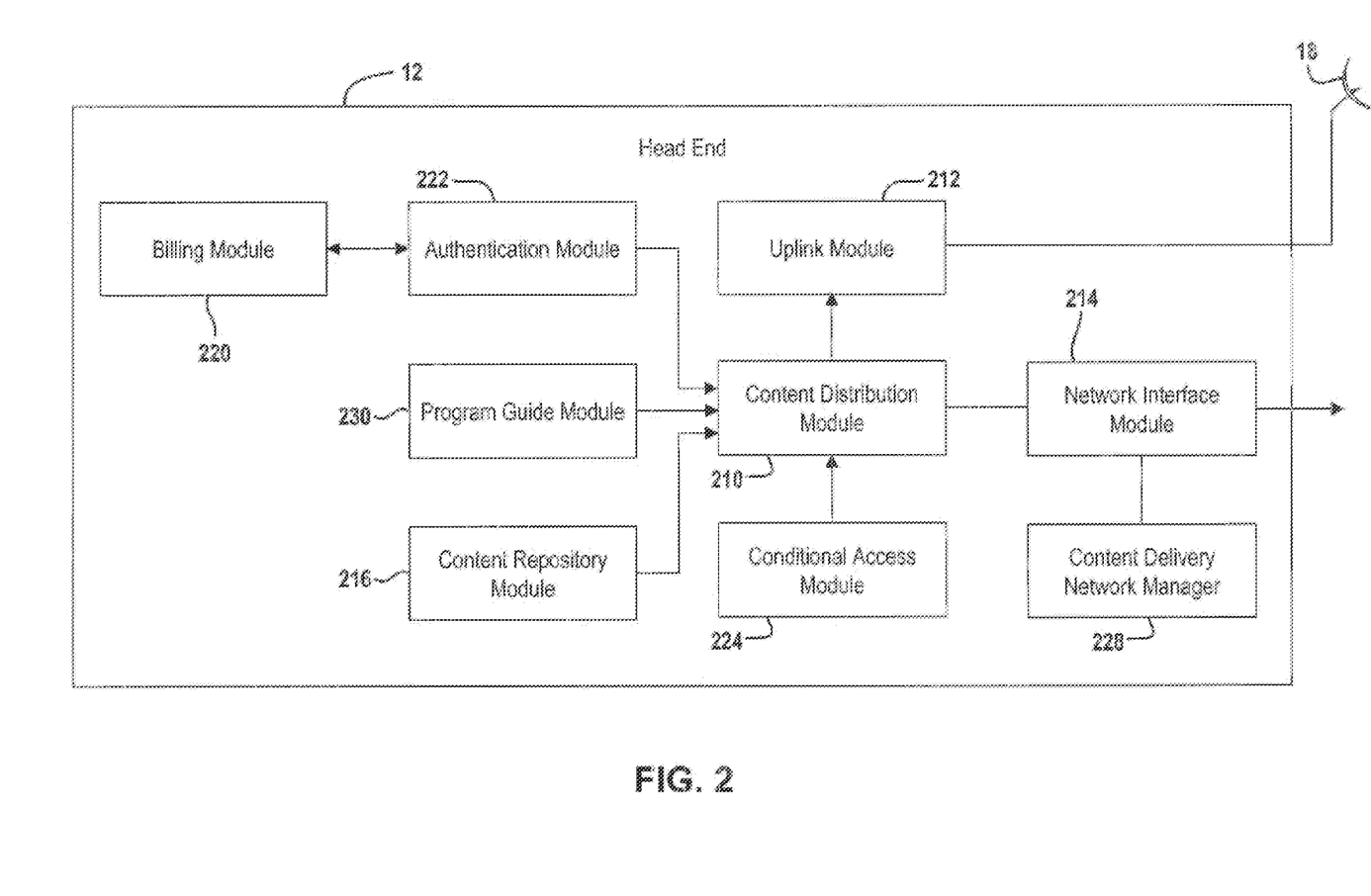
FIG. 2 is a block diagrammatic view of the headend.

Referring now to FIG. 2, details of the head end 12 relevant to the present example are set forth. It should be noted that the bead end 12 is illustrated within one box which may represent one or more facilities. That is, each of the individual components illustrated within the head end 12 may be physically located in various locations.

The head end 12 may include a content distribution module 210 that is used for distributing content through different means. The content distribution module 210 may be in communication with an uplink module 212 for uplinking content to the satellite through the uplink antenna 18 as illustrated in FIG. 1. The content distribution module 210 may thus format the signal in an appropriate format for uplinking through the uplink module 212. The uplink module 212 may uplink various content including a first content and a second content through the satellite to the user devices. The content distribution module 210 may also transcode the content in a format suitable for use by the receiving device.

The uplink module 212 may also communicate conditional access data to the user devices for accessing the content. The conditional access data may be communicated in a conditional access packet that includes data for tuning the user device to receive the data. The conditional access data may be received directly or indirectly from a conditional access module 224. The conditional access module 224 may provide conditional access signals to the billing module 220 to allow a particular user access to content. The conditional access module 224 may generate a conditional access packet together with data from the billing module 220 for uplinking through the uplink module 212. If the content is satellite content, access data such as, but not limited to, the particular transponder, channel and time at which the content is broadcasted may be provided in the conditional access packet. If the content is to be provided over an internet or other broadband-type network, the IP address of the content may be provided. The conditional access packet may also include encryption/decryption information for the user device to receive the content and decode the content.

The content distribution module 210 may also be in communication with a network interface module 214. The network interface module 214 may be in communication with the content delivery network 42 (of FIG. 1) for communicating content therethrough. The network interlace module 214 (or the content distribution module 210) may format the content signals into internet protocol (CIP) signals for distribution through the network 42.

The content distribution module 210 may also be in communication with content repository module 216. The content repository 216 may receive content from the content provider 14 for distribution through the satellite system or the content delivery network 42. The content repository module 216 may store on-demand or pay-per-view content therein.

The content provider 14 may also provide live television content for distribution through the content distribution module 210. The content distribution module 210 may thus communicate live content through the uplink module 212 or through the network interface module 214 to the appropriate networks.

A billing module 220 may also be incorporated into the head end 12. The billing module 220 may be used for associating one or more user devices with a user account. For example, different types of user devices such as a plurality of mobile devices and one or more fixed set top boxes may be associated with a user account. By associating the plurality of user devices with a user account, content may be shared or accessed by each of the user devices associated with an account.

An authentication module 222 may be used to associate each of the plurality of user receiving devices with a user account at the billing module 220. The authentication module 222 may be an automated system through which the user calls or accesses remotely by computer for associating the plurality of user devices with the account. The authentication module 222 may also be partially human activated in which a customer service representative enters the data for multiple user devices and associates the user devices with an account.

The authentication module 222 may also be used to identify and authenticate a user during the request for content to be provided. The authentication module 222 may act as an authentication web service module for authenticating users through the broadband network. The authentication web service may also authenticate fixed user devices such as set top boxes. The authentication module 222 of the headend 12 may be in communication with various devices such as a content delivery network and the content delivery network manager associated therewith.

The headend 12 may also include a content delivery network manager 228. The content delivery network manager 228 may be used to control access to the content delivery network associated with a particular content. The content delivery network manager 228 may, for example, return a manifest address or universal resource locator (URL) and a content delivery network (CDN) token. The interaction with the client device and the content delivery network will be described in detail below. The content delivery network manager 228 may also be located outside of the headend.

A program guide module 230 may also be included within the head end 12. The program guide module 230 receives metadata and other data from the content provider 14 that corresponds to future content. Future content is content that will be broadcasted at a future time (beyond the present time). The program guide module 230 is ultimately used to communicate the content data and metadata to the uplink module 212. The program guide module 230 may thus contain data related to the ratings of the particular content to be broadcasted and controlled by the content distribution module 210. The program guide module 230 (and the program guide repository module 216) may be a web service used for providing program guide data to requesting devices or services through the network.

Figure 3A:
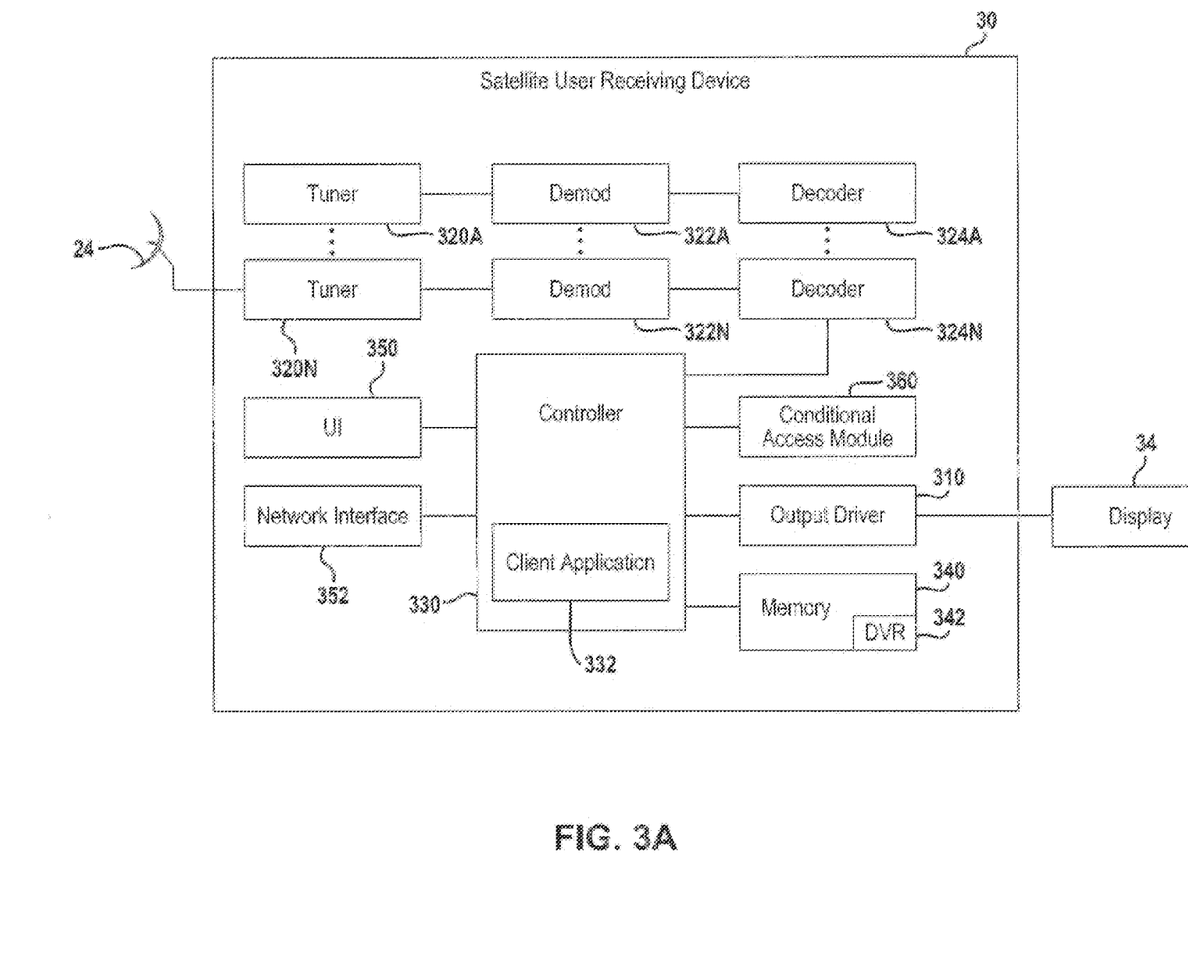
FIG. 3A is a block diagrammatic view of the satellite user receiving device.

Referring now to FIG. 3A, the user receiving device 30 or set top box is illustrated in further detail. In this example, the set top box is a satellite television set top box. Although, a particular example using the set top box is illustrated, it is merely representative of various electronic devices with an internal controller used as a content receiving device. Set top boxes or televisions with control circuitry therein may include search functions. The antenna 24 may be one of a number of different types of antennas that may include one or more low noise blocks associated therewith. The antenna 24 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. The user receiving device 30, as described above, is coupled to a display 34. The user receiving device 30 may have an output driver 310 for formatting video and audible signals for the display 34.

The user receiving device 30 may include a controller 330 that may be a general processor such as a microprocessor that cooperates with control software. The controller 330 may be used to coordinate and control the various functions of the user receiving device 30. These functions may include toner 320A-320N (collectively 320), demodulator 322A-322N (collectively 322), decoders 324A-324N (collectively 324) such as forward error correction decoders and any buffet or other functions.

The tuners 320 receive the signal or data from the individual channel. The tuners 320 may receive data from a satellite or a source such as cable or over-the-air TV broadcasts. The tuners 320 may receive television programming, content, program guide data or other types of data. The demodulators 322 demodulate the signal or data to form a demodulated signal or data. The decoders 324 decode the demodulated signal to form decoded data or a decoded signal. The controller 330 may be similar to that found in current DIRECTV® set top boxes which uses a chip-based multifunctional controller. By providing a number of tuners, demodulators and decoders, a number of different content programs may be used by the receiving device. For example, live viewing and recording may be performed simultaneously. A number of recordings may be made simultaneously depending on the number of turners available.

The controller 330 may also include a client application 332. The client application 332 is used to control various functions including interactions with the content delivery network manager module 228 and the content delivery network 50 illustrated in FIGS. 1 and 2.

The controller 330 is in communication with a memory 340. The memory 340 is illustrated as a single box. The memory 340 may be implemented as a plurality of different types of memory including the hard drive, a flash drive and various other types of memory. The memory 340 may be other types of memory or sections of different types of memory. The memory 340 may be non-volatile memory or volatile memory. The memory 340 may include a DVR 342. The DVR 342 may include recorded content stored for later playback.

The memory 340 may include storage for various operational data collected during operation of the receiving device 30. For example, the memory 340 may store a profile or the data used to build the profile. Another type of data in the memory 340 may include the channels subscription data, the blocked channels, adult channels, rating limits set by the user receiving device 30, current set top box language, TV resolution data, to do list data, the conditional access module identifier, time zone data, time of day daylight savings, status data, aspect ratio data, viewing hours data, viewed content, playlist data, quick tune list and a zip code.

The memory 340 may also store the advanced program guide data. The memory 340 may store program guide data that is received at the head end. The program guide data may include amounts of data including two or more weeks of program guide data. The program guide data may be communicated to the user receiving device 30 in various manners including through the satellite 22 of FIG. 1. The program guide data may include content or program identifiers, and various data objects corresponding thereto.

The user receiving device 30 may also include a user interface 350. The user interface 350 may be various types of user interfaces such as a keyboard, push buttons, a touch screen, a voice activated interface or the like. The user interface 350 may be used to select a channel, select information such as content selections, change the volume, change the display appearance, or other functions. The user interface 350 may also be used for selecting playback locations of the content.

A network interface 352 may be included within the user device 30 to communicate various data through the networks 36/42 described above. The network interface 352 may be a WiFi, WiMax, WiMax mobile, wireless, cellular, or other types of communication systems. The network interlace 352 may use various protocols for communication therethrough including, but not limited to, hypertext transfer protocol (HTTP).

The user device 30 may also include a conditional access module 360. The conditional access module 360 prevents unauthorized reception of the television signals through the antenna 24. The conditional access module 360 may use a cryptographic hash to authorize the use and display of the received signals. The conditional access module 360 may receive the proper codes or signals from the head end.

Figure 3B:
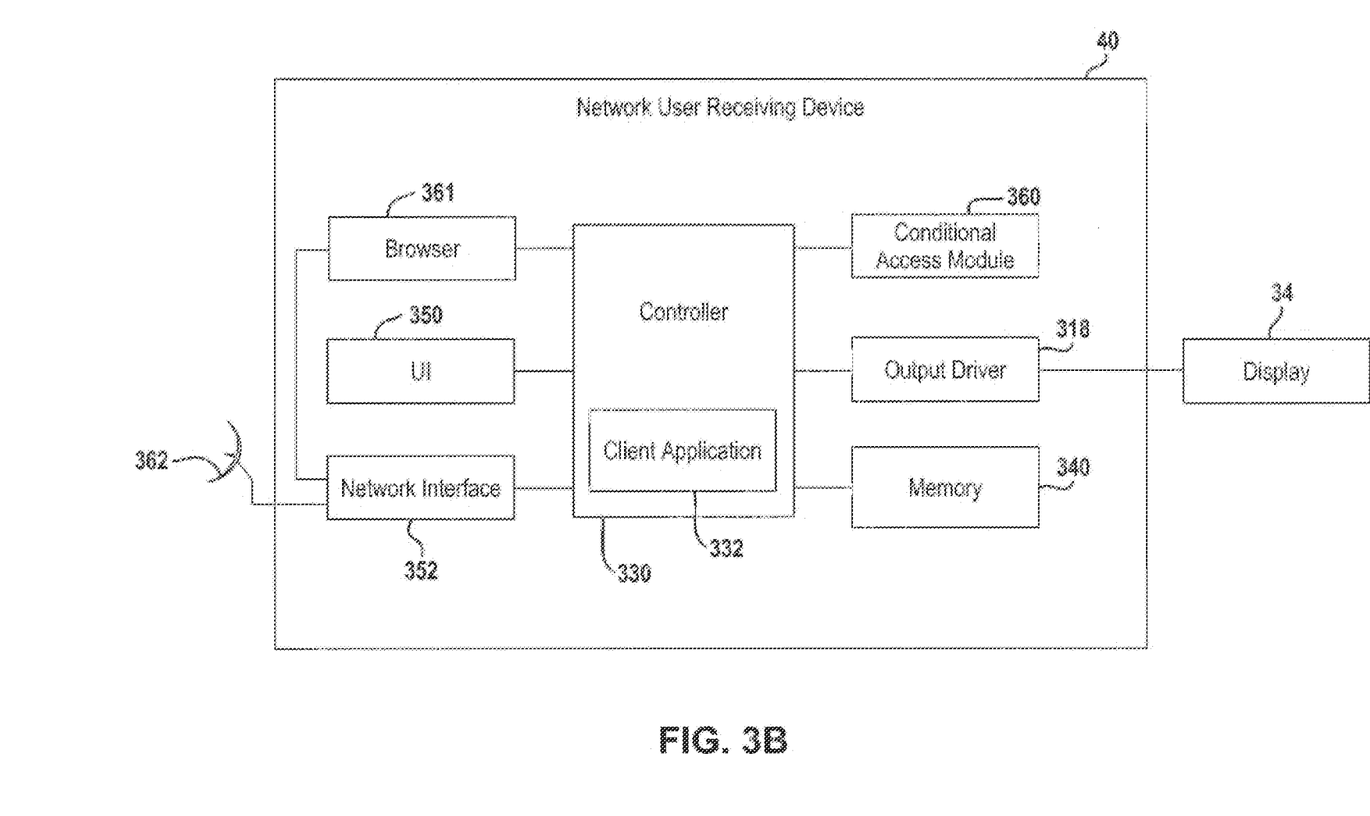
FIG. 3B is a block diagrammatic view of a network user receiving device.

Referring now to FIG. 3B a mobile or network user receiving device 40 is set forth. In this example, the same components from FIG. 3A are not described again. In this example, a browser 361 may be used to receive content and guide data and communicate data such as content selections to the controller 330. The browser 361 may also communicate playback status signals to the head end through the network. The browser 361 may be in communication with the network interface module 352. The network interface module 352 may communicate wireless signals through the antenna 362.

Figure 4:
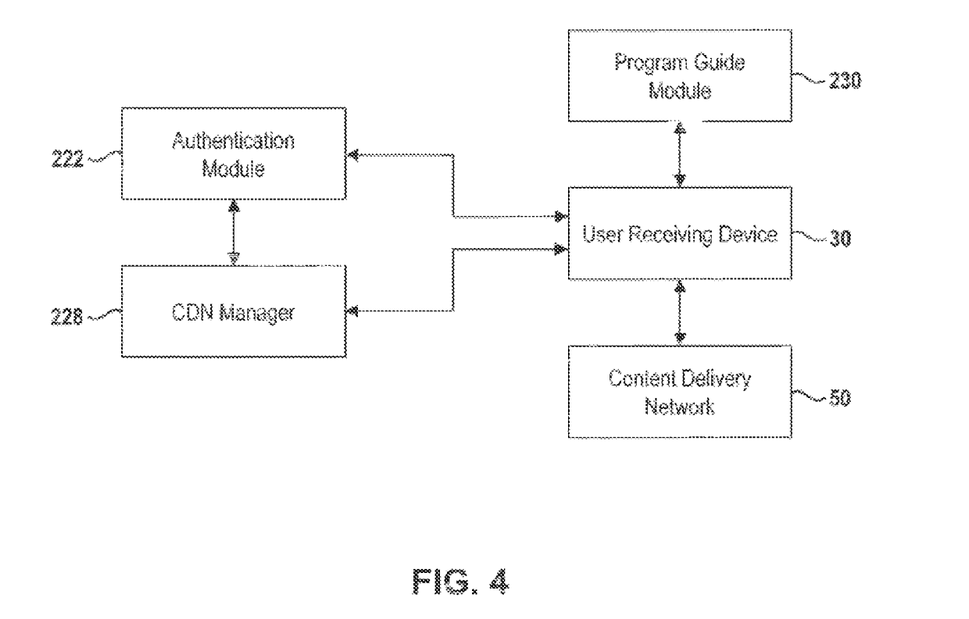
FIG. 4 is a simplified block diagrammatic view of the system.

Referring now to FIG. 4, a simplified block diagrammatic view of the system is set forth. The user receiving device 30 is used by way of example. However, other user receiving devices 30 prime, 40 and 40 prime may be used.

Figure 3C:
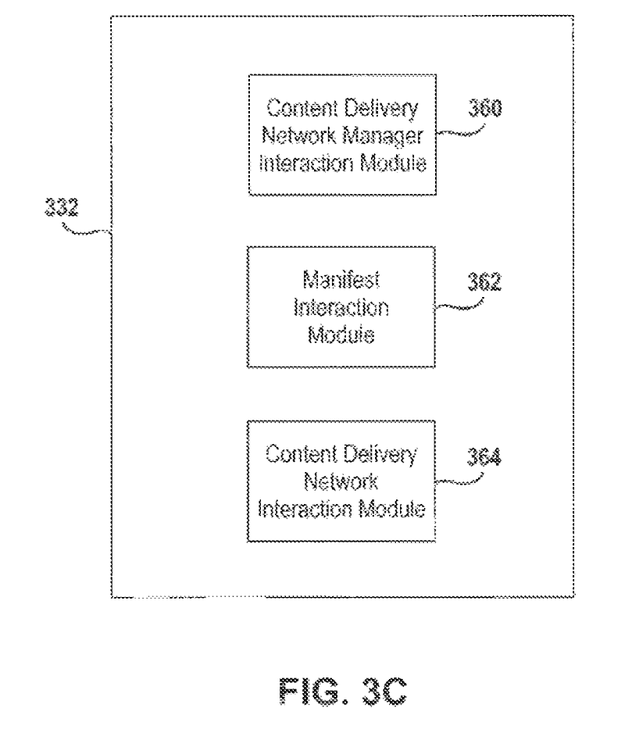
FIG. 3C is a block diagrammatic view of the client application of the controller.

Referring now to FIG. 3C, the client application 332 is illustrated in further detail. The client application 332 may include a content delivery network manager interaction module 360. The content delivery network manager interaction module 360 is used to interact with the content delivery network manager of the headend illustrated in FIG. 2. The content delivery network manager interaction module 360 may generate and communicate a request for a content delivery network address for a requested content. The content delivery network interaction module 360 interacts with the network interface 352 to communicate the request for a content delivery network address to the content delivery network address manager. The request may be a general request for the content delivery network address or for the manifest of the particular content. The content delivery network manager interaction module 360 receives the content delivery network address for the content delivery network and a chunk token from the content delivery network manager. The received data such as the content delivery network address and the chunk token may be stored in the memory 340 illustrated in FIG. 3A.

The client application 332 may also include a manifest interaction module 362 that communicates a manifest request to the content delivery network address. The manifest interaction module receives a manifest from the content delivery network that comprises a plurality of chunk addresses corresponding to the data location of the chunk. As mentioned above a chunk is a small portion of content. A plurality of chunks makes up the entire content. Chunks may be various sizes such as about 10 second long in terms of playback times. Chunks may include a plurality of TCP/IP packets therein. The manifest may also be stored in the memory 340 of the user receiving device.

The client application 332 may also include a client delivery network interaction module 364. The content delivery network interaction module 364 may request chunks of the content from the content delivery network using the token and a respective chunk address. The content delivery network token is the same token, for each of the chunks requested. The address for each chunk changes whir each request. The content delivery network interaction module 364 may also receive the chunks from the content delivery network and stores the chunks within the memory 340 for eventual playback or display on the display associated with the user receiving device.

As mentioned above, the request for the content delivery network address may include a material identifier, a user identifier associated with the user receiving device and a device type corresponding to the type of device of the user receiving device. Some or all of the above may be used in the request. Further, portions of the above, like certain bits may also be used. The content delivery network token may also use a portion or the full IP address of the user requesting device, a token expiration time and a material identifier of the request for the chunk to verify the request for each chunk.

Figure 5:
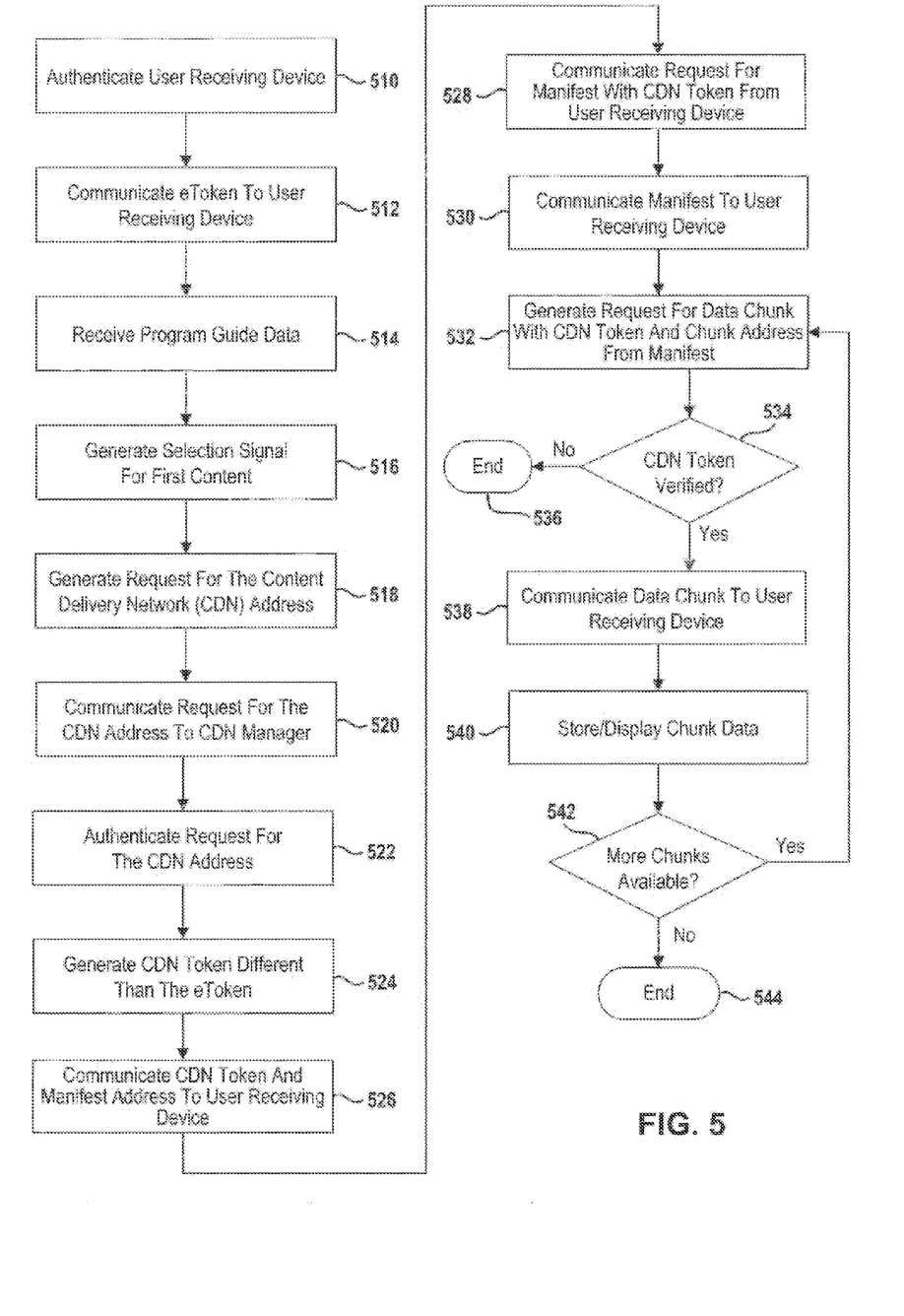
FIG. 5 is a flow chart of the method for operating the present disclosure.

Referring now to FIGS. 4 and 5, the interaction of the system components of FIG. 4 is illustrated in conjunction with the method set forth in FIG. 5. In step 510 the user receiving device is authenticated into the system 10. Authentication may take place in various manners. The user receiving device identifies itself to the authentication module 222. This may be provided using an account number a password or various other types of identifiers. This may be performed when user first signs up for service. This may be performed at other times such as when the user receiving device seeks program guide information for content availability. Ultimately, an electronic token (eToken) is communicated to the user receiving device from the authentication module 222 in step 512.

In step 514 the user receiving device 30 receives program guide data. The program guide data may originate from the program guide module 230. Depending upon the type of user receiving device. The program guide data may originate from an advanced program guide (APG) system in the headend which is communicated through the satellite. Another way in which program guide data may be communicated is through a web service such as a program guide web service. Program guide web data may be communicated through the network 42 such as the internet.

In step 516 a selection signal is generated for first content. The received program guide data may be displayed on a screen display and a selection signal may be generated for the first content. The selection signal may be generated at a user interface associated with a user receiving device. A touch screen, mouse click, remote control button push may all be used to form the selection signal.

In response to the selection signal the user receiving device generates a request for a content delivery network address for the first content. The request for a content delivery network address may include a material identifier for the first content that corresponds to the selection signal. The material identifier is part of the metadata that is received in the program guide data of step 514. Other types of data may also be included in the request for a content delivery network address including a user identifier that identifies the user receiving device. The user identifier may be a combination of letters and numbers that represents the user receiving device. The user identifier may be unique to the user receiving device or to the account. Another type of data that may be included in the request for content delivery network address is a device type. The device type corresponds to the type of user receiving device making the request. For example, the device type may be a particular brand or model of set top box. Other examples of a device type may be an Android® or Apple® receiving device. Portable computers and the type of screen display associated with the mobile computers may also be included within the device type. The screen resolution may also be identified by the device type. The request for content delivery network address originates from a network address associated with the user receiving device. The CDN manager may use the user receiving device address.

The request for content delivery network address may also include or be electronic token provided to the user receiving device in step 512.

In step 520 the request for the content delivery network address is communicated to the content delivery network manager 228. In step 522 the content delivery network manger 228 authenticates the request for content delivery network address. This may be done by communicating the electronic token to the authentication module 222 which verifies the electronic token. Other data such as the material identifier, user identifier, the address of the user receiving device and device type may all be used in the verification of the request for the content delivery network address.

In step 524 a content delivery network (CDN) token different than the electronic token is generated. The content delivery network token may be generated at the authentication module 222 or the content delivery manager 228 in response to the verification of the e-token. It should be noted that the content delivery network token is different than the electronic token communicated in step 520. The content delivery token may be static in that it does not change for a predetermined amount of time. As mentioned above the expiration time may be a predetermined number of hours or minutes from the creation time of the token.

The content delivery network token be generated to include various types of data or representations of various types of data. The content delivery network token may also be encrypted. The content, delivery network token may, for example, use the material identifier provided, in the request for content delivery network address therein. The entire material identifier or a selected portion of the material identifier may be used. Another type of data that may be used to form the content delivery network token is an expiration time. The expiration time may be a predetermined time from the time when the content delivery artwork token is created. The expiration time and the content delivery network token may be set to allow the end user to obtain the entire requested content or playback the entire requested content. For example, if the requested content is a movie, an extra time period beyond the playback time period may be provided. For example, a typical movie is around 1.5 hours. An expiration time for a 1.5 hour movie may be set at 2.5 hours, 3 hours, 3.5 hours or 4 hours to allow the entire movie to be played back as well as rewinding and pausing in a reasonable way. Should the content delivery network token expire, a request for a new content delivery network token may be obtained in a similar manner to that described above. The request for a content delivery network token may originate from the IP address of the user receiving device. The IP address of the requesting user receiving device may also be included within the token. The requesting user receiving device IP address may be used fully or a selected portion or portions may be used.

In step 526 the content delivery network token is communicated from the content delivery network manager 228 to the user receiving device 30 through the network. A manifest address may also be included within the communication. The manifest address may be a uniform resource locator (URL). The manifest address is the address for the manifest of the chunks of data that will ultimately be requested. As mentioned above, chunk data may be requested by the user receiving device so that playback may begin at the earliest possible time. The manifest corresponding to the manifest address includes the address of each chunk of data that will ultimately be requested by the user receiving device.

In step 528 the request for a manifest is communicated to the content delivery network from the user receiving device.

In step 530 the content delivery network communicates the manifest to the user receiving device. In step 532 a request for the first chunk of data in the manifest is communicated with the content delivery network token using the chunk address within the manifest. In step 534 the token is verified. If the content delivery network token is not verified, step 536 ends the process without providing the content. An error message may also be communicated or displayed at the user receiving device.

When the content delivery network token is verified in step 534, step 538 communicates the data chunk to the user receiving device. In step 540 the user receiving device stores or displays the chunk of data. In step 542 it is determined whether more chunks are available by reviewing the manifest. If more chunks are available in the manifest, step 532 generates another request for a data chunk using the next data chunk address from the manifest and the content delivery network token. If more chunks are not available (i.e., no more chunks are listed in the manifest), the process ends in step 544.

In this manner, all of the data chunks may be provided to the user receiving device using the same content delivery network token. Playback may begin as soon as the first data chunk is fully received at the user receiving device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   generating a content delivery network address for a content delivery network based on a material identifier for a content and a user device type of a user receiving device;
   communicating a manifest request for the content to the content delivery network address from the user receiving device;
   generating a content delivery network token at the content delivery network or an authentication module;
   communicating the content delivery network token and a manifest to the user receiving device;
   receiving the content delivery network token at the user receiving device;
   receiving the manifest from the content delivery network comprising a plurality of chunk addresses;
   generating, at the user receiving device, requests for chunks of the content from the content delivery network using the content delivery network token and a respective chunk address of the plurality of chunk addresses for each of the requests, each chunk comprising a plurality of packets;
   verifying the content delivery network token; and
   receiving the chunks at the user receiving device from the content delivery network in response to generating requests and verifying.

2. The method as recited in claim 1 wherein communicating the manifest request comprises communicating the manifest request from a client application of a mobile device.

3. The method as recited in claim 1 wherein communicating the manifest request comprises communicating the manifest request from a client application of a set top box.

4. The method as recited in claim 1 wherein communicating the manifest request comprises communicating the manifest request from a client application of a satellite television set top box.

5. The method as recited in claim 1 wherein verifying the content delivery network token comprises verifying the content delivery network token at the content delivery network.

6. The method as recited in claim 5 wherein the content delivery network token comprises a first user receiving device address, and wherein the requests for chunks originate from a second user receiving device address and wherein verifying the content delivery network token at the content delivery network comprises comparing the first user receiving device address and the second user receiving device address.

7. The method as recited in claim 6 wherein the content delivery network token comprises a first material identifier, and wherein the requests for chunks have a second material identifier and wherein verifying the content delivery network token at the content delivery network comprises comparing the first material identifier and the second material identifier.

8. The method as recited in claim 6 wherein verifying the content delivery network token comprises verifying the content delivery network token at the content delivery network using a token expiration time.

9. The method as recited in claim 8 wherein the token expiration time is greater than two hours.

10. A method comprising:
    communicating a request for a content delivery network address for a content from a client application of a user receiving device to a content delivery network manager, said request comprising a material identifier for the content and a user device type;

authenticating the request;
generating the content delivery network address based on the material identifier and the user device type;
generating a content delivery network token in response to authenticating;
communicating the content delivery network token to the user receiving device;
receiving the content delivery network address for a content delivery network and the content delivery network token at the client application from the content delivery network manager;
communicating a manifest request to the content delivery network address of the content delivery network;
communicating the manifest to the user receiving device;
receiving the manifest from the content delivery network comprising a plurality of chunk addresses;
generating requests for chunks of the content from the content delivery network using the content delivery network token and a respective chunk address, each of the chunks comprising a plurality of packets;
verifying the content delivery network token; and
receiving the chunks at the user receiving device from the content delivery network in response to generating the requests and verifying the requests.

11. The method as recited in claim 10 further comprising storing the chunks in a memory of the user receiving device and displaying the chunks from the memory.

12. The method as recited in claim 10 wherein communicating the request for the content delivery network address from the client application of the user receiving device comprises communicating the request for the content delivery network address from the client application of a mobile device.

13. The method as recited in claim 10 wherein communicating the request for the content delivery network address from the client application of the user receiving device comprises communicating the request for the content delivery network address from the client application of a set top box.

14. The method as recited in claim 10 wherein communicating the request for the content delivery network address from the client application of the user receiving device comprises communicating the request for the content delivery network address from the client application of a satellite television set top box.

15. The method as recited in claim 10 wherein communicating the request for the content delivery network address comprises communicating the request having a user identifier associated with the user receiving device.

16. The method as recited in claim 10 wherein communicating the request for the content delivery network address comprises communicating the request having a user identifier associated with the user receiving device and the device type.

17. The method as recited in claim 10 wherein communicating the request for the content delivery network address comprises communicating the request having a user identifier associated with the user receiving device, a material identifier and the device type.

18. The method as recited in claim 10 wherein receiving the content delivery network address for content delivery network and the content delivery network token comprises receiving the content delivery network address for the content delivery network and a static content delivery network token having an expiration time that is a predetermined time from a token creation time.

19. The method as recited in claim 10 wherein verifying the content delivery network token comprises verifying the content delivery network token at the content delivery network.

20. The method as recited in claim 19 wherein the content delivery network token comprises a first user receiving device address, and wherein the requests for chunks originate from a second user receiving device address and wherein verifying the content delivery network token at the content delivery network comprises comparing the first user receiving device address and the second user receiving device address.

21. The method as recited in claim 19 wherein the content delivery network token comprises a first material identifier, and wherein the requests for chunks have a second material identifier and wherein verifying the content delivery network token at the content delivery network comprises comparing the first material identifier and the second material identifier.

22. The method as recited in claim 19 wherein verifying the content delivery network token comprises verifying the content delivery network token at the content delivery network using a token expiration time.

23. The method as recited in claim 22 wherein the token expiration time is greater than two hours.

24. A user receiving device having a user device type, said user receiving device for communicating with a content delivery network manager and a content delivery network comprises:
a content delivery network manager interaction module communicating a request for a content delivery network address for a content to the content delivery network manager, said request comprising a material identifier for the content and the user device type and receiving the content delivery network address that is based on the material identifier and the user device type for the content delivery network and a content delivery network token from the content delivery network manager;
a manifest interaction module communicating a manifest request to the content delivery network address of the content delivery network and receiving a manifest from the content delivery network comprising a plurality of chunk addresses; and
a content delivery network interaction module generating requests for chunks of the content from the content delivery network using the content delivery network token and a respective chunk address, each of the chunks comprising a plurality of packets, causing the content delivery network token to be verified and receiving the chunks from the content delivery network after verification.

25. The user receiving device as recited in claim 24 wherein the request for the content delivery network address comprises a user identifier associated with the user receiving device.

26. The user receiving device as recited in claim 24 wherein the request for the content delivery network address comprises a user identifier associated with the user receiving device and the device type.

27. The user receiving device as recited in claim 24 wherein the request for the content delivery network address comprises a user identifier associated with the user receiving device, the material identifier and the device type.

28. The user receiving device as recited in claim 24 wherein the content delivery network token comprises a static content delivery network token having an expiration time that is a predetermined time from a token creation time.

29. A system comprising:
a content delivery network manager;
a content delivery network; and
a user receiving device as recited in claim 24.

30. The system as recited in claim 29 wherein the user receiving device comprises a mobile device.

31. The system as recited in claim 29 wherein the user receiving device comprises a set top box.

32. The system as recited in claim 29 wherein the user receiving device comprises a satellite television set top box.

33. The system as recited in claim 29 wherein the content delivery network verifies the content delivery network token prior to receiving the chunks.

34. The system as recited in claim 33 wherein the content delivery network token comprises a first user receiving device address, and wherein the user receiving device has a second user receiving device address and wherein the content delivery network verifies the content delivery network token by comparing the first user receiving device address and the second user receiving device address.

35. The system as recited in claim 33 wherein the content delivery network token comprises a first material identifier, and wherein the requests for chunks have a second material identifier and wherein the content delivery network verifies the content delivery network token by comparing the first material identifier and the second material identifier.

36. The system as recited in claim 33 wherein the content delivery network verifies a token expiration time.

37. The system as recited in claim 36 wherein the token expiration time is greater than two hours.

* * * * *